United States Patent [19]
DiRisio

[11] Patent Number: 6,089,486
[45] Date of Patent: Jul. 18, 2000

[54] FILM CARTRIDGE WITH PAWL AND RATCHET

[75] Inventor: Anthony DiRisio, Rochester, N.Y.

[73] Assignee: Eastman Kodak Company, Rochester, N.Y.

[21] Appl. No.: 09/292,296

[22] Filed: Apr. 15, 1999

[51] Int. Cl.$^7$ .................................................. G23B 23/02
[52] U.S. Cl. ................... 242/348; 242/348.3; 242/355.1; 396/514
[58] Field of Search ..................................... 242/343, 347, 242/348, 348.1, 348.2, 348.3, 348.4, 355, 355.1, 358, 358.1; 396/512, 514, 528

[56] References Cited

U.S. PATENT DOCUMENTS

| | | |
|---|---|---|
| 554,769 | 2/1896 | Brownell . |
| 579,949 | 4/1897 | Brownell . |
| 999,679 | 8/1911 | Selig . |
| 2,537,883 | 1/1951 | Ernisse . |
| 2,552,200 | 5/1951 | Mihalyi . |
| 2,566,267 | 8/1951 | Wallace . |
| 2,731,894 | 1/1956 | Leitz et al. . |
| 3,276,714 | 10/1966 | Steisslinger et al. . |
| 3,286,945 | 11/1966 | Steisslinger . |
| 3,768,747 | 10/1973 | Edwards et al. . |
| 3,894,700 | 7/1975 | Ito et al. . |
| 4,802,633 | 2/1989 | Beery .................................. 396/514 X |
| 5,031,853 | 7/1991 | Jensen . |
| 5,115,268 | 5/1992 | Kitagawa et al. . |
| 5,317,355 | 5/1994 | Zander et al. .................... 242/348.4 X |
| 5,320,300 | 6/1994 | Gorman et al. . |
| 6,019,309 | 2/2000 | Entz .................................. 242/348.4 X |

Primary Examiner—Donald P. Walsh
Assistant Examiner—William A. Rivera
Attorney, Agent, or Firm—Roger A. Fields

[57] ABSTRACT

A film cartridge having a housing, a spool rotatable in film winding and unwinding directions within the housing, a film roll wound onto the spool and having a clock-springing tendency to urge the spool in the film unwinding direction, and an anti-backup pawl and cooperating ratchet teeth arranged on the housing and the spool for the pawl to engage any one of the ratchet teeth to prevent the clock-springing tendency of the film roll from urging the spool in the film unwinding direction and for the pawl to be disengaged from successive ones of the ratchet teeth when the spool is rotated in the film winding direction to wind the film roll onto the spool, is characterized in: that the housing includes a sheath that partially covers the film roll, that has a film passage opening, and that is resilient to permit the sheath to be flexed; and the pawl and the ratchet teeth are rigid and one of them is arranged on the sheath to allow the pawl and successive ones of the ratchet teeth to flex the sheath in order to disengage from one another when the spool is rotated in the film unwinding direction, whereby a filmstrip that forms the film roll can be pulled off the spool and through the film passage opening.

7 Claims, 6 Drawing Sheets

FILM CARTRIDGE WITH PAWL AND RATCHET

FIELD OF THE INVENTION

The invention relates generally to the field of photography, and in particular to film cartridges. More particularly, the invention relates to a film cartridge with an anti-backup pawl and cooperating ratchet that act to impede rotation of a film spool in a film unwinding direction within the cartridge housing.

BACKGROUND OF THE INVENTION

A film cartridge typically includes a rigid housing, at least one spool rotatable in film winding and unwinding directions within the housing, and a film roll wound onto the spool. The film roll has a clock-springing tendency to urge the spool in the film unwinding direction. An anti-backup pawl and cooperating ratchet teeth may be arranged on the housing and the spool for the pawl to engage any one of the ratchet teeth to prevent the clock-springing tendency of the film roll from urging the spool in the film unwinding direction and for the pawl to be disengaged from successive ones of the ratchet teeth when the spool is rotated in the film winding direction to wind the film roll onto the spool. See, for example, prior art U.S. Pat. Nos. 3,276,714 issued Oct. 4, 1966, and No. 3,286,945 issued Nov. 22, 1966.

The anti-backup pawl is usually resilient or springy in order to allow successive ones of the ratchet teeth to bend the pawl out of engagement with the respective teeth when the spool is rotated in the film winding direction. Conversely, the pawl engages any one of the teeth at a locking angle that prevents the pawl from yielding to disengage from that tooth when an attempt is made to rotate the spool in the film unwinding direction.

SUMMARY OF THE INVENTION

A film cartridge comprising a housing, a spool rotatable in film winding and unwinding directions within the housing, a film roll wound onto the spool and having a clock-springing tendency to urge the spool in the film unwinding direction, and an anti-backup pawl and cooperating ratchet teeth arranged on the housing and the spool for the pawl to engage any one of the ratchet teeth to prevent the clock-springing tendency of the film roll from urging the spool in the film unwinding direction and for the pawl to be disengaged from successive ones of the ratchet teeth when the spool is rotated in the film winding direction to wind the film roll onto the spool, is characterized in that:

the housing includes a sheath that partially covers the film roll, that has a film passage opening, and that is resilient to permit the sheath to be flexed; and the pawl and the ratchet teeth are rigid and one of them is arranged on the sheath to allow the pawl and successive ones of the ratchet teeth to flex the sheath in order to disengage from one another when the spool is rotated in the film unwinding direction, whereby a filmstrip that forms the film roll can be pulled off the spool and through the film passage opening.

In one variation of the film cartridge, the ratchet teeth include a first set of teeth which have the same tooth-to-tooth distance and a second set of teeth which have the same tooth-to-tooth distance as the first set and are in alignment with the first set. The pawl and another pawl are arranged out of alignment by one-half of the tooth-to-tooth distance to alternately engage any one of the teeth in the respective sets each time the spool is rotated one-half of the tooth-to-tooth distance.

In a second variation of the film cartridge, the ratchet teeth include a first set of teeth which have the same tooth-to-tooth distance and a second set of teeth which have the same tooth-to-tooth distance as the first set and are out of alignment with the first set by one-half of the tooth-to-tooth distance. The pawl and another pawl are arranged in alignment for them to alternately engage any one of the teeth in the respective sets each time the spool is rotated one-half of the tooth-to-tooth distance.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Preferred Embodiment (FIGS. 1–4)

Figure 1:
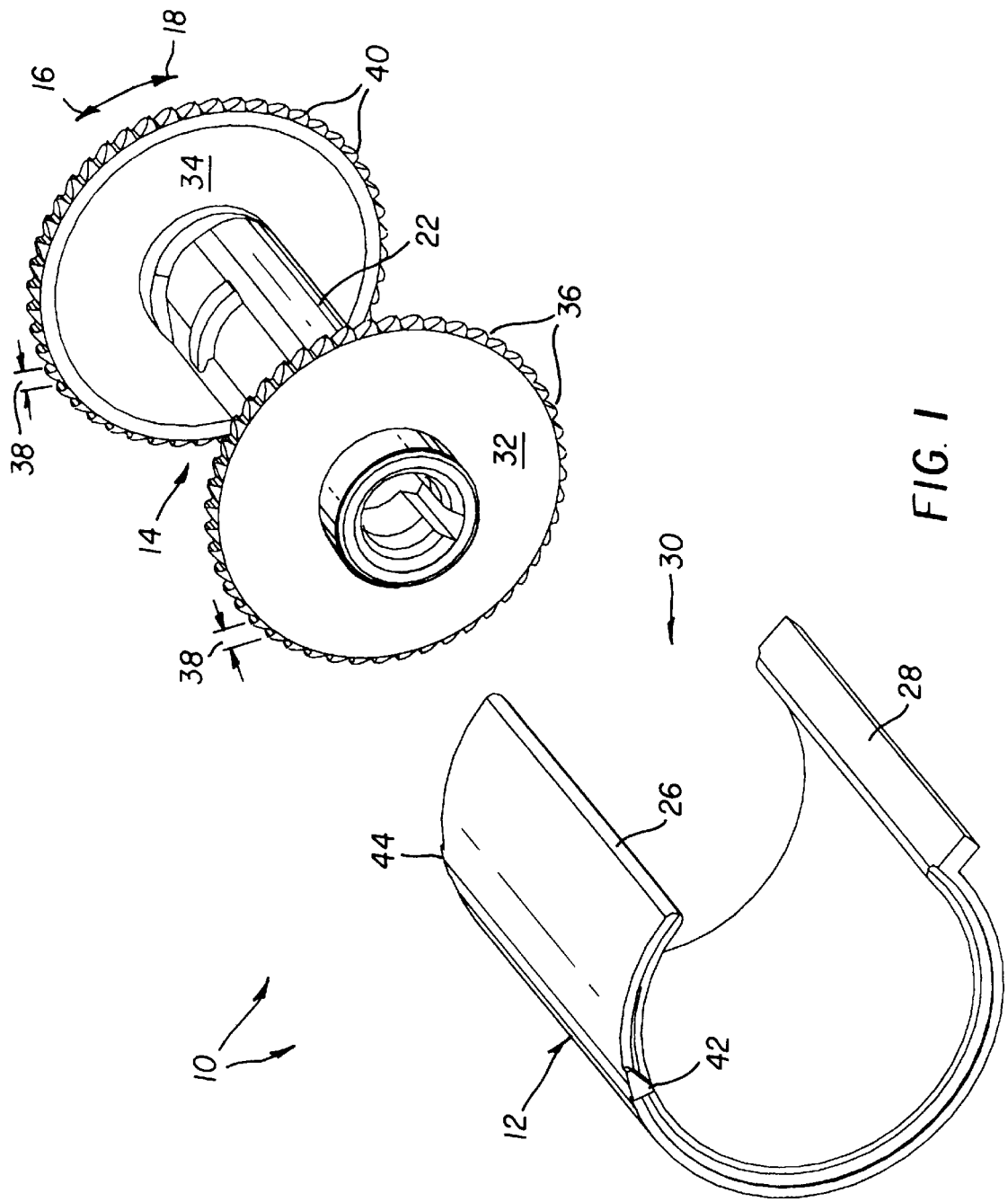
FIG. 1 is an exploded perspective view of a film cartridge with a pair of anti-backup pawls and two sets of ratchet teeth according to a preferred embodiment of the invention.
Figure 2:
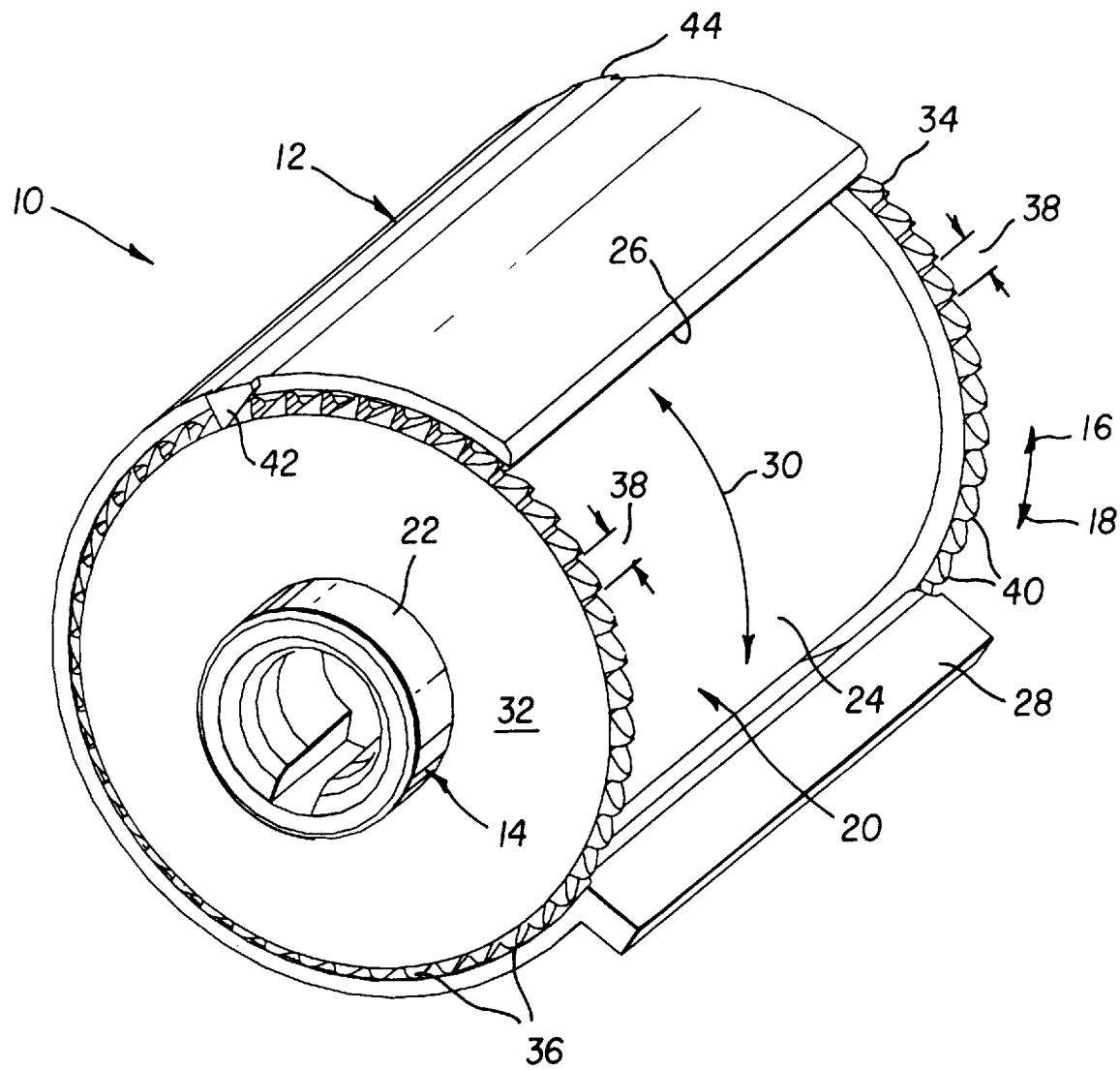
FIG. 2 is an assembled perspective view of the film cartridge.
Figure 3:
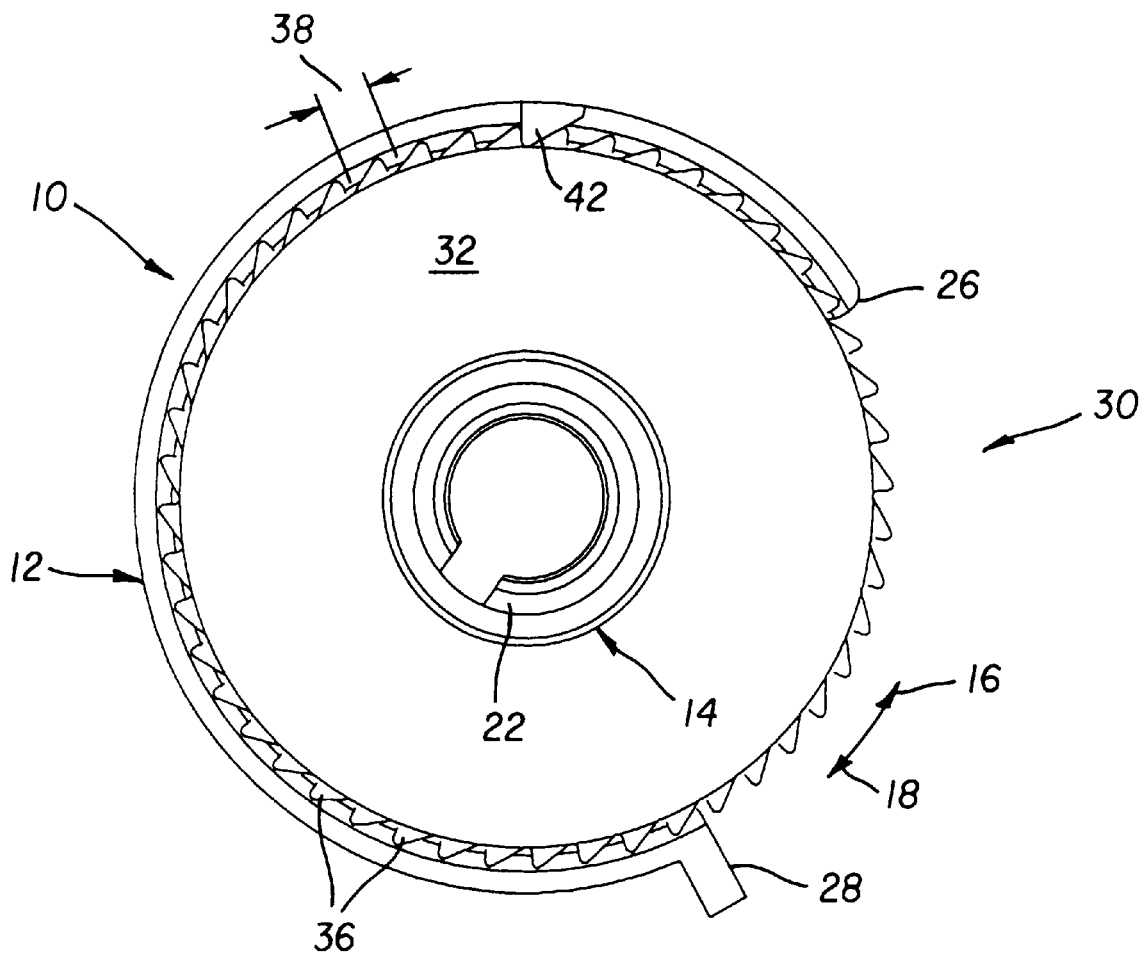
FIG. 3 is an end view of the film cartridge.
Figure 4:
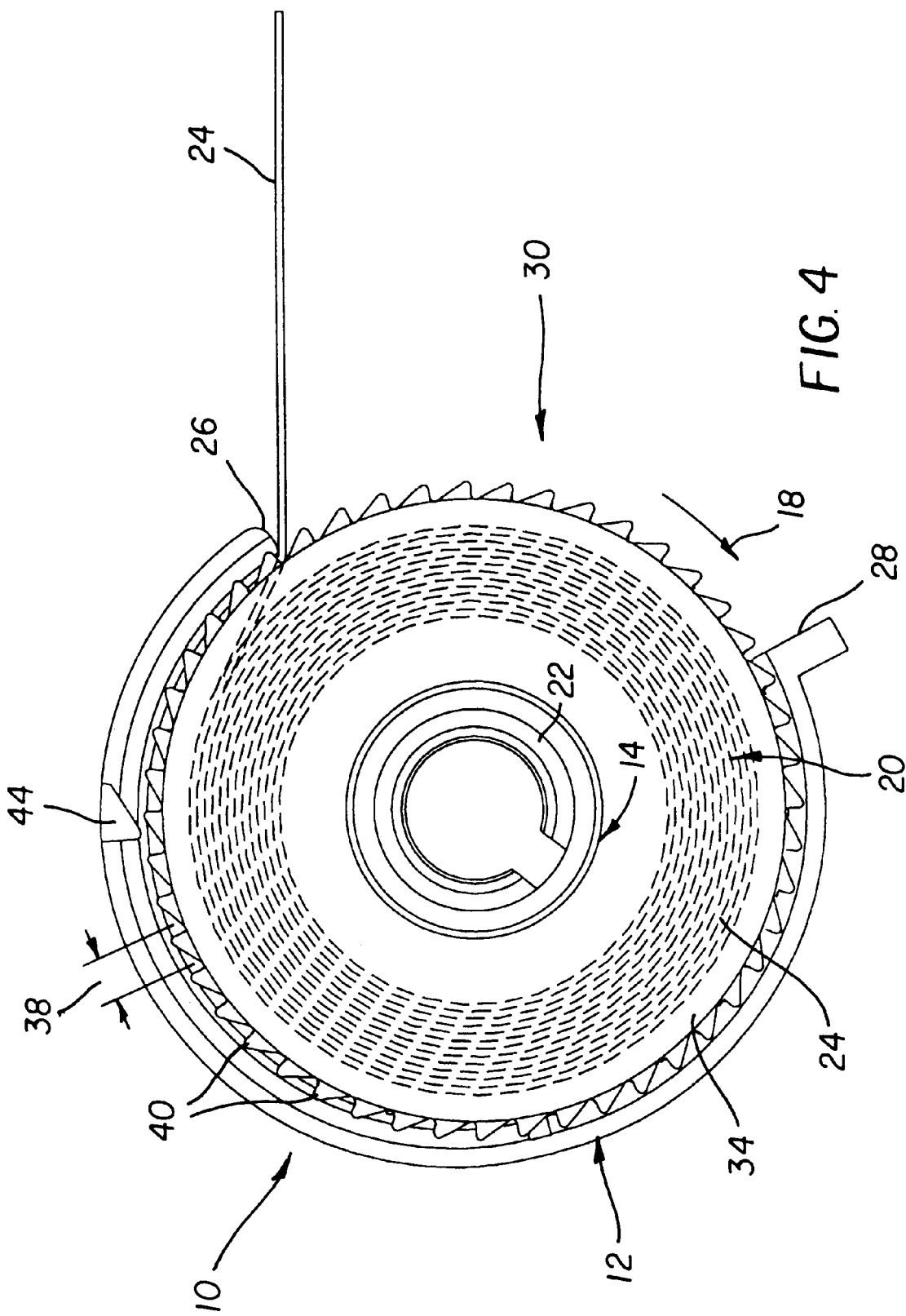
FIG. 4 is a section view of the film cartridge.

Referring now to the drawings, FIGS. 1–4 show a film cartridge 10 including a c-shaped sheath 12 and a spool 14 which is rotatable in a film winding direction 16, i.e. counter-clockwise in FIGS. 1–4, and a film unwinding direction 18, i.e. clockwise in the FIGS. A film roll 20 is wound onto the spool 14 and has a known clock-springing tendency to urge the spool in the film unwinding direction 18. FIG. 4 shows the film roll 20 spaced from a core 22 of the spool 14. This is simply for clarity. Actually, the innermost end (not shown) of the filmstrip 24 that forms the film roll 20 is secured to the core 22.

The sheath 12 partially covers the film roll 20 and has a pair of opposite end portions 26 and 28 that are spaced apart to define a film passage opening 30 between them. The sheath 12 has an elastic construction to be resilient, i.e. capable of being deformed or flexed and of recovering its original shape after being deformed or flexed.

The spool 14 has an identical pair of parallel flanges 32 and 34 axially spaced apart on the core 22. The flange 32 is rigid, i.e. inflexible, and has a first set of rigid ratchet teeth 36 which have the same tooth-to-tooth distance 38, i.e. pitch. The flange 34 is rigid and has a second set of rigid ratchet teeth 40 which have the same tooth-to-tooth distance 38 as the first set of ratchet teeth 36 and they are in alignment with the first set.

A rigid anti-backup pawl 42 is arranged on the sheath 12 to engage any one of the ratchet teeth 36 in the first set. A rigid anti-backup pawl 44 is arranged on the sheath 12 in alignment with the other pawl 42 to engage any one of the ratchet teeth 40 in the second set when the other pawl engages a corresponding (aligned) one of the ratchet teeth 36 in the first set. This engagement is to prevent the clock-springing tendency of the film roll 20 from urging the spool 14 in the film unwinding direction 18.

When the spool 14 is rotated in the film winding direction 16 to wind the film roll 20 onto the spool, the rigid pawls 42 and 44 are periodically disengaged from successive ones of the rigid teeth 36 and 40 in the first and second sets. In essence, successive ones of the ratchet teeth 36 and 40 can simultaneously cam the pawls 42 out of engagement with the respective teeth due to the elastic construction of the sheath 12.

When the filmstrip 24 is begun to be pulled outwardly through the film passage opening 30 from the spool 14 as shown in FIG. 4, it displaces the end portion 26 of the sheath 12 farther away from the other end portion 28 of the sheath, which flexes the sheath in the vicinity of the pawls 42 and 44 to disengage the pawls from the respective ratchet teeth 36 and 40 that the pawls are then engaging. Thus, the spool 14 can be rotated in the film unwinding direction 18.

Figure 5:
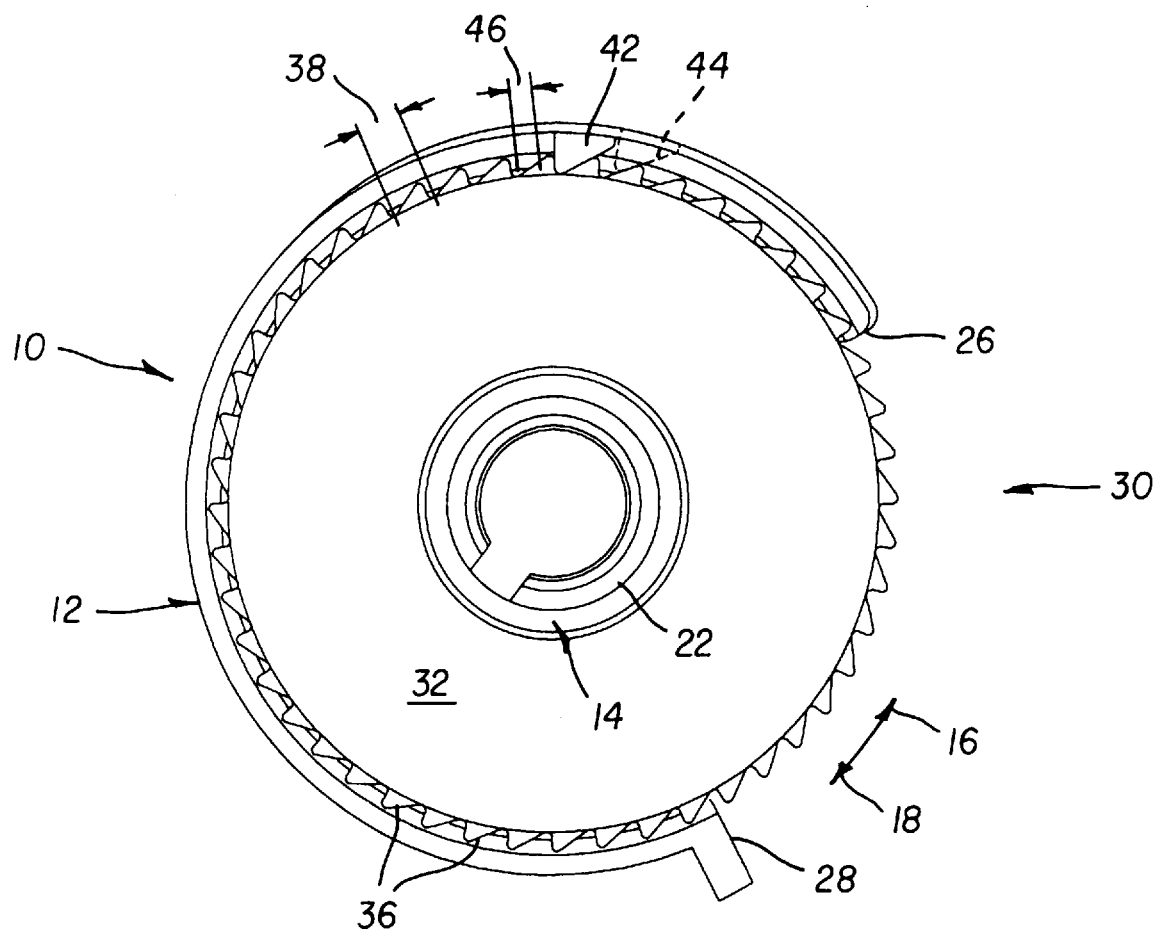
FIG. 5 is an end view of a first alternate embodiment of the film cartridge.

First Alternate Embodiment (FIG. 5)

In FIG. 5, the film cartridge 10 is identical to the preferred one shown in FIGS. 1–4 except that the pawl 42 is out of alignment with the pawl 44 by one-half 46 of the tooth-to-tooth distance 38. Thus, the pawls 42 and 44 alternately engage any one of the ratchet teeth 36 and 40 in the respective sets each time the spool 14 is rotated one-half 46 of the tooth-to-tooth distance 38.

Figure 6:
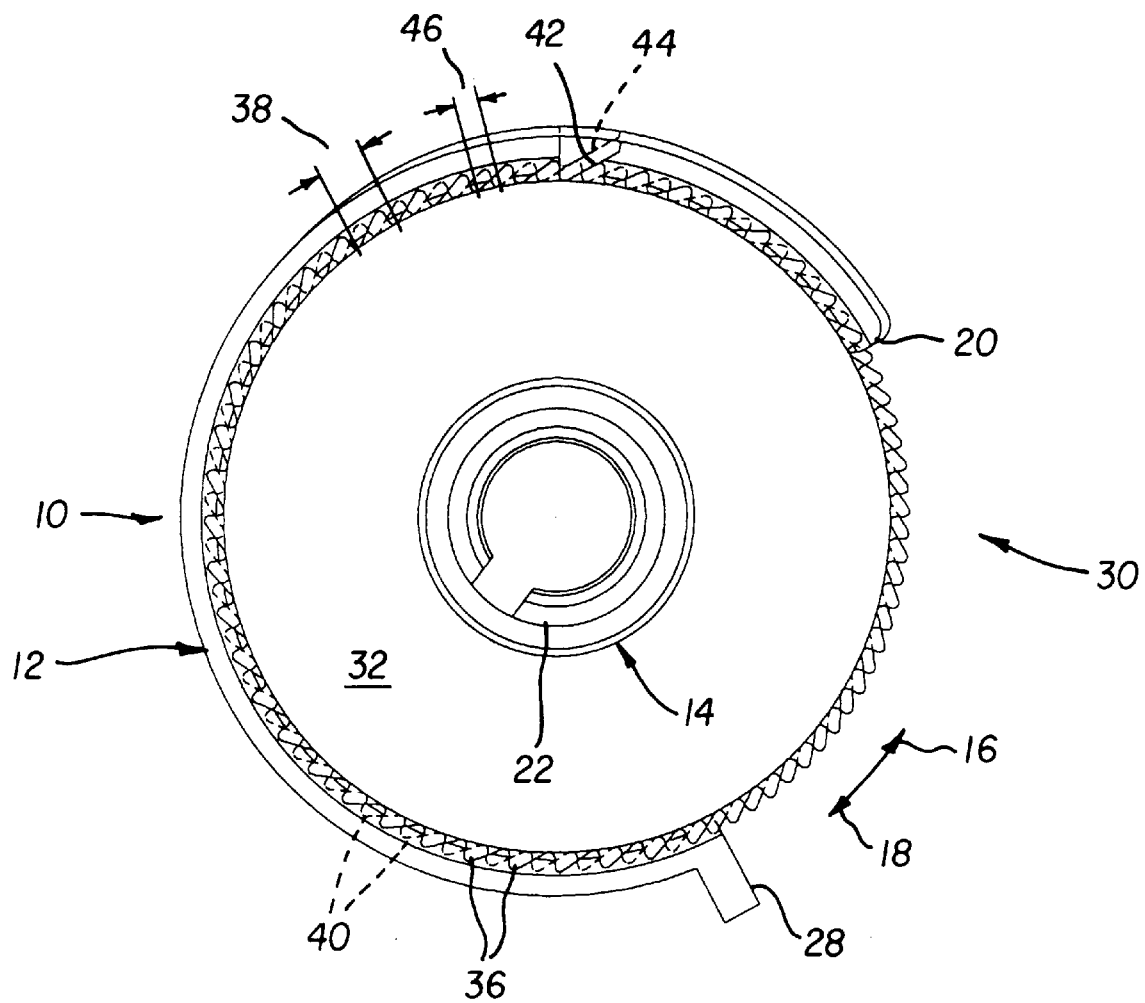
FIG. 6 is an end view of a second alternate embodiment of the film cartridge.

Second Alternate Embodiment (FIG. 6)

In FIG. 6, the film cartridge 10 is identical to the preferred one shown in FIGS. 1–4 except that the ratchet teeth 36 and 40 in the respective sets are out of alignment by one-half 46 of the tooth-to-tooth distance 38. Thus, the pawls 42 and 44 alternately engage any one of the ratchet teeth 36 and 40 in the respective sets each time the spool 14 is rotated one-half 46 of the tooth-to-tooth distance 38.

The invention has been described with reference to a preferred embodiment. However, it will be appreciated that variations and modifications can be effected by a person of ordinary skill in the art without departing from the scope of the invention.

PARTS LIST 10. film cartridge
12. sheath
14. spool
16. film winding direction
18. film unwinding direction
20. film roll
22. core
24. filmstrip
26. end portion
28. end portion
30. film passage opening
32. flange
34. flange
36. ratchet teeth
38. tooth-to-tooth distance
40. ratchet teeth
42. anti-backup pawl
44. anti-backup pawl
46. one-half distance

What is claimed is:

1. A film cartridge comprising a housing, a spool rotatable in film winding and unwinding directions within said housing, a film roll wound onto said spool and having a clock-springing tendency to urge said spool in the film unwinding direction, and an anti-backup pawl and cooperating ratchet teeth arranged on said housing and said spool for said pawl to engage any one of said ratchet teeth to prevent the clock-springing tendency of said film roll from urging said spool in the film unwinding direction and for said pawl to be disengaged from successive ones of said ratchet teeth when said spool is rotated in the film winding direction to wind said film roll onto said spool, is characterized in that:

said housing includes a sheath that partially covers said film roll, that has a film passage opening, and that is resilient to permit said sheath to be flexed; and said pawl and said ratchet teeth are rigid and one of them is arranged on said sheath to allow said pawl and successive ones of said ratchet teeth to flex said sheath in order to disengage from one another when said spool is rotated in the film unwinding direction, whereby a filmstrip that forms said film roll can be pulled off said spool and through said film passage opening.

2. A film cartridge as recited in claim 1, wherein said sheath has opposite end portions that are spaced apart to define said film passage opening between said end portions and which are further separated when said sheath is flexed in order to disengage said pawl and successive ones of said ratchet teeth.

3. A film cartridge as recited in claim 1, wherein said ratchet teeth include a first set of teeth having the same tooth-to-tooth distance and a second set of teeth having the same tooth-to-tooth distance as the first set and being out of alignment with the first set by one-half of the tooth-to-tooth distance, and said pawl and another pawl are arranged in alignment for them to alternately engage any one of said teeth in the respective sets each time said spool is rotated one-half of the tooth-to-tooth distance.

4. A film cartridge as recited in claim 1, wherein said ratchet teeth include a first set of teeth having the same tooth-to-tooth distance and a second set of teeth having the same tooth-to-tooth distance as the first set and being in alignment with the first set, and said pawl and another pawl are arranged out of alignment by one-half of the tooth-to-tooth distance to alternately engage any one of said teeth in the respective sets each time said spool is rotated one-half of the tooth-to-tooth distance.

5. A film cartridge comprising a housing, a spool rotatable in film winding and unwinding directions within said housing, a film roll wound onto said spool and having a clock-springing tendency to urge said spool in the film unwinding direction, and an anti-backup pawl and cooperating ratchet teeth arranged on said housing and said spool for said pawl to engage any one of said ratchet teeth to prevent the clock-springing tendency of said film roll from urging said spool in the film unwinding direction and for said pawl to be disengaged from successive ones of said ratchet teeth when said spool is rotated in the film winding direction to wind said film roll onto said spool, is characterized in that:

said housing includes a sheath that partially covers said film roll, that has opposite end portions spaced apart to define a film passage opening between said end portions, and that is elastically constructed for a filmstrip that forms said film roll to displace one of said end portions farther away from the other end portion in order to flex said sheath to disengage said pawl and any one of said ratchet teeth when said filmstrip is pulled through said film passage opening from said spool, whereby said spool will be rotated in the film unwinding direction.

6. A film cartridge comprising a housing, a spool rotatable in film winding and unwinding directions within said housing, a film roll wound onto said spool and having a clock-springing tendency to urge said spool in the film unwinding direction, and an anti-backup pawl and cooperating ratchet teeth arranged on said housing and said spool for said pawl to engage any one of said ratchet teeth to prevent the clock-springing tendency of said film roll from urging said spool in the film unwinding direction and for said pawl to be disengaged from successive ones of said ratchet teeth when said spool is rotated in the film winding direction to wind said film roll onto said spool, is characterized in that:

said ratchet teeth include a first set of teeth having the same tooth- to-tooth distance and a second set of teeth having the same tooth-to-tooth distance as the first set and being out of alignment with the first set by one-half of the tooth-to-tooth distance; and said pawl and another pawl are arranged in alignment for them to alternately engage any one of said teeth in the respective sets each time said spool is rotated one-half of the tooth-to-tooth distance.

7. A film cartridge comprising a housing, a spool rotatable in film winding and unwinding directions within said housing, a film roll wound onto said spool and having a clock-springing tendency to urge said spool in the film unwinding direction, and an anti-backup pawl and cooperating ratchet teeth arranged on said housing and said spool for said pawl to engage any one of said ratchet teeth to prevent the clock-springing tendency of said film roll from urging said spool in the film unwinding direction and for said pawl to be disengaged from successive ones of said ratchet teeth when said spool is rotated in the film winding direction to wind said film roll onto said spool, is characterized in that:

said ratchet teeth include a first set of teeth having the same tooth- to-tooth distance and a second set of teeth having the same tooth-to-tooth distance as the first set and being in alignment with the first set; and said pawl and another pawl are arranged out of alignment by one- half of the tooth-to-tooth distance to alternately engage any one of said teeth in the respective sets each time said spool is rotated one-half of the tooth-to-tooth distance.

* * * * *